Patented Nov. 19, 1940

2,222,510

UNITED STATES PATENT OFFICE 2,222,510

ART OF COATING LUMINESCENT TUBES

Sampson Isenberg and Rudolph C. Hultgren, Chicago, Ill., assignors to General Luminescent Corporation, Chicago, Ill., a corporation of Illinois No Drawing. Application October 7, 1940, Serial No. 360,201

12 Claims. (Cl. 250—81)

Our invention relates to methods for coating tubes with luminescent material, and to the production of products utilizable for such purposes.

In the production of so-called luminescent tubes, it is common practice to utilize a method which has for its object to firmly attach the luminescent material in relatively finely divided powder form to the surface of the glass or partially imbed it within the surface of the glass so that subsequent treatment of the tube will not dislodge the powder. For example, the inside of a glass tube may first be treated with some foreign matter which will act as a permanent binder, for example, sodium or potassium silicate, or a material which will have a tendency to partially soften the glass or flux with the glass. Whatever the material employed, a conventional practice has been first to treat the inside surface with some material which will cause the powder to adhere to the glass surface, and then dust the powder into the tube to produce a coating. This method almost always requires subsequent baking of the tube at a high temperature, either for the purpose of driving out foreign materials used in the coating method or to set the coating substances which are to remain in position. These methods, while usable with some degree of satisfaction, in general are objectionable from the cost standpoint and also because it is extremely difficult to obtain uniformly dependable results.

The object of our invention is to produce tubes, having a coating of luminescent material, in a more economical and practical manner.

Another object is to employ a method for this purpose by virtue of which uniform results will be obtained.

Another object is to produce an improved luminescent tube.

A further object is the provision of an improved coating material particularly adapted for use in the coating method.

Other specific objects and features of the invention will be apparent from a consideration of the following detailed description.

In accordance with the general features of our invention, we incorporate the luminescent material in a suspending medium with which it is compatible, preferably a fluid of high volatility, by grinding or ball milling the luminescent material after its production, in, or with, the suspending liquid. By this means, we produce a relatively heavy material of liquid characteristics comprising the liquid suspending medium and the luminescent material, which, for identification, we may term "the ground material." This ground material is then introduced into the tube to be coated by a flowing operation, preferably by holding the tube in a vertical position and flowing the suspension into and out of the tube. The liquid ground material is allowed to flow out of the tube at a controlled rate to leave a relatively thin coating on the inside walls thereof. A drying gas, such as air, may then be passed through the tube to remove the volatile liquid forming a part of the ground material suspension, leaving only the luminescent material adhering to the glass surface. The tube so treated is then ready for further processing as, for example, the mounting of electrodes in place, the evacuation of the tube, and the subsequent introduction of suitable amounts of mercury and argon or neon or other gaseous or vaporizable material which it is desired to use.

Our method preferably involves the use of no conventional binding material although, as will be noted subsequently, substances may be introduced for producing a smoother coat than might otherwise be produced by the use of a particular liquid suspending vehicle.

Before proceeding to a detailed description of the invention, we wish to point out that it is our conception of the results produced by our invention that grinding the already relatively finely divided luminescent material with a liquid produces a different size and shape of particle than is obtainable by dry grinding; that is to say, a particle which is relatively flat, and, because of the manner of introduction or for other reasons not fully understood, will tend to lie flat against the glass surface, thus covering a larger area than it otherwise would cover and being therefore more adherent. Our investigations indicate also that the coated particles lie very close together on the inside surface of the tube, that is, substantially edge to edge throughout, so that, if a blast of air is blown against a portion of the surface, as, for example, when an evacuated tube is suddenly opened to atmosphere at one point, little or none of the applied particles will be blown from the surface. Indeed, under these circumstances we have found that less of the coating material is blown from the surface than in the case where conventional dusting methods are employed with substances presumably functioning as binders. It is our concept that, under these circumstances, the particles being so close together, the air cannot strike around the edges but will fall on the outer surface of the particles and tend to force them against the glass surface rather than blow them off the glass surface.

Whether our investigations as to the reasons for the results which we obtain are correct or not, we have found as a fact that the grinding of the material is important to the securing of the results which we obtain. We have found also that the time of grinding is important. If the materials be not ground together for a long enough period, there will be a tendency to produce horizontal streaks; while, if the grinding time is too long, vertical streaks will be observed. Thus, the grinding should be long enough so that the transition point is attained at which a perfectly smooth and uniform coat results.

In connection with the grinding, we wish to point out that some types of fluorescent or luminescent materials may be affected deleteriously by prolonged grinding. However, the material made in accordance with the directions given in application Serial No. 360,169 filed October 7, 1940, in the name of one of the present joint applicants, is not appreciably affected in any adverse way by grinding, its light output when excited in the region of 2537 (the ultra violet region) particularly being unaffected. It is primarily in the ranges indicated that coatings of the type discussed are employed. We shall refer to this factor further in this specification.

In accordance with a preferred embodiment of our invention, we produce a luminescent material in the manner disclosed in the application above referred to and having a fineness of about 200 mesh, and place five pounds of such material (for example, a Willemite material) in a ball mill with 2500 cc. of of methyl alcohol. The ball mill is loaded with flint stones and operated until the luminescent material is at least fine enough to pass a 400 mesh screen. As an example, the ball mill may be operated for about twelve hours. The ground material is then diluted with about 2500 cc. of methyl alcohol, thereby producing the finished material used in the coating method. The coating material so produced is then flowed into a clean tube and allowed to flow out at a uniform, relatively slow rate, and leave a relatively thin coating on the inside of the tube. The tube is then dried by the passing of air through it, and, if desired, the tube may be inverted and then subjected to the same coating process the second time. If desired, a proportion of a more viscous material, such as propylene glycol, glycerine or other suitable viscous material, may be incorporated. For example, we have found that a small amount of propylene glycol added to each ounce of the coating material will assist in producing a smooth coat, although, in general, the results obtained without the use of propylene glycol are adequate and, in general, substantially better than those secured by the methods of the prior art. In using a higher viscosity material, the proportion may be varied over a relatively wide range, but, if the proportion be high, particularly if the material be of high viscosity, heat is required for driving such material from the tube. Heat may be supplied by passing a hot gas through the tube, or by baking the tube.

In the grinding of the luminescent material with the methyl alcohol or other liquid chemically inert with respect to the luminescent material, the preferred grinding means is, as pointed out, a ball mill. We find considerable advantage results from employing only a part of the liquid in the ball mill and then subsequently adding to the material, as ground, an additional amount of the liquid sufficient to produce the fluidity and concentration desired. The proportion of liquid employed in the ball mill should be great enough so that the resulting ground material is a relatively heavy liquid-like product. It should be of decidedly less consistency than a paste, otherwise suitable results will not be obtained, and we find that if the material is too thin in the ball mill much more extensive grinding is necessary to obtain the proper suspension. In general, in the final product, proportions of the order of about one pound of the luminescent material to about 1000 cc. of the liquid are very suitable.

Referring now further to the types of liquid suspending vehicles, it has already been pointed out that any relatively low molecular weight liquid with which the luminescent material is compatible may be employed, and, by relatively low molecular weight vehicle, we have in mind primarily a liquid which has a sufficiently high vapor pressure at ordinary room temperature that it may be removed substantially completely by evaporation at normal temperatures or temperatures not appreciably above room temperature. It is preferred that the vapor pressure be such that operations can be carried on at room temperature and by the use of ordinary air as the drying medium. Should a higher viscosity material be incorporated, however, as referred to hereinabove, heat may be employed to drive off such material.

Among the liquids which may be used successfully are the relatively low molecular weight alcohols, ketones, aldehydes and esters, preferably of the aliphatic series but also of the aromatic series where the vapor pressure is not too low. Benzol ($C_6H_6$) is illustrative of an aromatic compound which may be used satisfactorily. Some of the low molecular weight aliphatic compounds, such as the unsaturated and saturated hydrocarbons, may also be used. We may further employ mixtures of any of these liquids. Acetone is illustrative of material which may be employed alone with good results. We find, however, that a mixture of about equal parts of acetone and methyl alcohol is preferably to acetone alone. Ethyl alcohol may be used, but, in general, a mixture of equal proportions of ethyl alcohol and methyl alcohol is preferred.

We have already pointed out that the material described in the co-pending application of Sampson Isenberg, one of the present joint inventors, is particularly suitable for use with the present invention. The Isenberg material is of the Willemite type and preferably employs a greater proportion of manganese than that found to exhibit maximum brilliancy without grinding. Some of the other luminescent materials which, on excitation, exhibit colors other than green seem to be somewhat more resistant to grinding than the Willemite type of material. In general, however, we find that, by using slightly greater proportions of the activating substance, the material is more resistant to grinding and can be used to somewhat greater advantage in carrying out our present invention.

As an example of the use of an increased amount of activator as referred to in the preceding paragraph, reference may be made to the copending Isenberg application identified hereinabove. Such application relates to the production of a Willemite type of material made more resistant to loss of brilliancy on grinding by the use of an increased amount of manganese as an activator.

The material described in the copending application contains twenty-five percent to seventy-five percent more manganese as an activator than that necessary in the identical matrix material to produce maximum brilliancy when exposed to a mercury discharge radiation. When such a material is crushed to two hundred or three hundred mesh, and then ground to four hundred mesh or less, its brilliancy remains substantially unchanged, while the identical matrix material, activated with less manganese but initially brighter, will suffer a marked loss in brilliancy due to prolonged grinding.

Thus, by employing a material which contains a greater proportion of activator than that which will produce maximum brilliancy in the same matrix material when unground but merely crushed, we prevent the usual loss of brilliancy which occurs during prolonged grinding, and we are able to produce a very desirable flowable suspension of very finely divided material of exceptional brilliancy. While this discovery applies generally to luminescent materials which are not themselves luminescent but require an activator, it is particularly true of the silicates activated with manganese, such as the greens, yellows, whites and reds comprising orthosilicates as the matrix material. The proportion of activator may be increased 25% to 75% depending upon the amount of grinding and other factors. The suspension material is of particular value for coating mercury discharge tubes by methods involving flowing said suspension into and out of a tube while the tube is held in a vertical position.

We secure several advantages by the use of our invention, some of which we wish to point out for the benefit of those skilled in the art. Comparing tubes made by the so-called dusting method and those made by our method, we find the following general conditions to exist with respect to luminosity. Tubes produced by one of the usual dusting methods and tested showed initially a brilliance of 48 to 50 foot candles on the average, but, after forty-eight hours, this had been reduced to 40 to 42 foot candles. The tubes made in accordance with our invention showed a brilliancy of about 50 foot candles average when originally produced, and, after forty-eight hours, averaged 43 to 44 foot candles. Thus it will be seen that the average is slightly higher and the tubes made in accordance with our invention are somewhat more resistant to aging than tubes made by the dusting method; that is to say, there is less drop in intensity on aging.

Among other advantages resulting from the present invention are the shade or color of the tube, which appears to be preferable when our coating method is used, and, also, the results produced are more uniform, that is to say, a given result may be reproduced with greater accuracy and dependability. Some of the principal advantages of the use of our invention, however, result from the fact that the luminescent material, when applied by our method, is more adherent than when a binder is employed onto which the luminescent material, in the form of a powder, is dusted. We find that the tubes are more workable, that is to say, they may be bent and otherwise manipulated to a greater extent without injuring the coating. Furthermore, we find that, when a tube produced in accordance with our invention has been broken so that the vacuum is suddenly destroyed, the luminescent material will not be blown off the inside surface of the tube, nor even around the immediate region of the break to any appreciable extent. The result is that the tube may be repumped and refilled, and then operated, as if the tube were entirely new. Repairs can be made, therefore, on old tubes without difficulty. This may be contrasted with tubes made by the so-called dusting method which, as a rule, cannot be repaired because the sudden admission of air, if the tube is broken, usually results in removing at least a relatively large proportion of the luminescent material from the inside surface.

Our present application is a continuation-in-part of our co-pending application Serial No. 263,412, filed March 22, 1939.

What we claim as new and desire to protect by Letters Patent of the United States is:

1. A suspension of luminescent material adapted for coating luminescent tubes by a method involving flowing the said suspension into and out of a tube while said tube is held in a vertical position, said suspension comprising a liquid vehicle and a luminescent material ground together, said liquid vehicle being a liquid highly volatile at room temperature, chemically inert with respect to the luminescent material, the particle size of the luminescent material being finer than 400 mesh, and the proportions being of the order of 1 pound of the luminescent material to 1000 cc. of the said liquid vehicle.

2. A suspension of luminescent material adapted for coating luminescent tubes by a method involving flowing the said suspension into and out of a tube, while said tube is held in a vertical position, said suspension comprising methanol and a luminescent material ground together until the luminescent material is finer than 400 mesh, the proportions being of the order of 1 pound of luminescent material to 1000 cc. of the methanol.

3. A suspension of luminescent material adapted for coating a mercury discharge tube by a method involving flowing the said suspension into and out of a tube while said tube is held in a vertical position, said suspension comprising a liquid vehicle and luminescent material of the silicate type finely ground in said liquid vehicle, said material consisting of a matrix material and an activator, and containing 25% to 75% excess activator over that necessary to provide maximum brilliancy in the identical matrix material if unground when exposed to a mercury discharge radiation, and said liquid vehicle comprising a liquid readily volatile at room temperature, said suspension being freely flowable and of such character as to produce a relatively thin adherent coating on the side walls of the said tube when employed in accordance with the identified method.

4. A suspension of luminescent material adapted for coating a mercury discharge tube by a method involving flowing the said suspension into and out of a tube while said tube is held in a vertical position, said suspension comprising a liquid vehicle and a luminescent material finely ground in said vehicle, said luminescent material being of the silicate type consisting of a matrix material and an activator, said luminescent material containing 25% to 75% excess activator over that necessary to provide maximum brilliancy in the identical matrix material if unground when exposed to a mercury discharge radiation, and said vehicle comprising liquid readily volatile at room temperature, the proportions being of the order of 1 pound of said luminescent material to 1000 cc. of the said voltaile liquid.

5. A suspension of luminescent material adapted for coating a mercury discharge tube by a method involving flowing the said suspension into and out of a tube while said tube is held in a vertical position, said suspension comprising a liquid vehicle and a luminescent material finely ground in said vehicle, said luminescent material being of the silicate type consisting of a matrix material and an activator, said luminescent material containing 25% to 75% excess activator over that necessary to provide a maximum brilliancy in the identical matrix material if unground when exposed to a mercury discharge radiation, and said vehicle comprising methanol, the proportions being of the order of 1 pound of said luminescent material to 1000 cc. of methanol.

6. A suspension of luminescent material adapted for coating a mercury discharge tube by a method involving flowing the said suspension into and out of a tube while said tube is held in a vertical position, said suspension comprising a liquid vehicle and a luminescent material finely ground in said vehicle, said luminescent material being of the silicate type consisting of a matrix material and an activator, the particle size of said luminescent material being finer than 400 mesh and said luminescent material containing 25% to 75% excess activator over that necessary to provide maximum brilliancy in the identical matrix material if unground when exposed to a mercury discharge radiation, and said liquid vehicle comprising a liquid readily volatile at room temperature, and being present in such proportions as to form a freely flowable suspension of such character as to produce a relatively thin adherent coating of said luminescent material on the side walls of the said tube.

7. A suspension of luminescent material adapted for coating a mercury discharge tube by a method involving flowing the said suspension into and out of a tube while said tube is held in a vertical position, said suspension comprising a liquid vehicle and a luminescent material finely ground in said vehicle, said luminescent material being of the silicate type consisting of a matrix material and an activator, the particle size of said luminescent material being finer than 400 mesh and said luminescent material containing 25% to 75% excess activator over that necessary to provide maximum brilliancy in the identical matrix material if unground when exposed to a mercury discharge radiation, and said liquid vehicle being methanol in sufficient proportion to form a freely flowable suspension of such character as to produce a relatively thin adherent coating of said luminescent material on the side walls of the said tube.

8. A suspension of luminescent material adapted for coating a mercury discharge tube by a method involving flowing the said suspension into and out of a tube while said tube is held in a vertical position, said suspension comprising methanol as a liquid vehicle and a luminescent material finely ground in said methanol, said luminescent material being of the silicate type consisting of a matrix material and an activator, the particle size of said luminescent material being finer than 400 mesh and said luminescent material containing 25% to 75% excess activator over that necessary to provide maximum brilliancy in the identical matrix material if unground when exposed to a mercury discharge radiation, the proportions being of the order of 1 pound of said luminescent material to 100 cc. of the methanol.

9. The method of producing a suspension of luminescent material adapted for coating a mercury discharge tube by a method involving flowing the said suspension into and out of a tube while said tube is held in a vertical position, said suspension comprising a very finely divided luminescent material consisting of a matrix material and an activator and a liquid vehicle comprising a liquid highly volatile at room temperature, which method comprises incorporating in said luminescent material during its production an increased amount of activator over that required to provide maximum brilliancy in an identical matrix material if unground when exposed to a mercury discharge radiation, whereby to prevent the usual loss of brilliancy during grinding, and grinding together the said luminescent material and at least a portion of said liquid vehicle, the proportion of liquid vehicle in the completed suspension being controlled to produce a freely flowing suspension of liquid-like character.

10. The method of producing a suspension of luminescent material adapted for coating a mercury discharge tube by a method involving flowing the said suspension into and out of a tube while said tube is held in a vertical position, said suspension comprising a very finely divided luminescent material consisting of a matrix material and an activator and a liquid vehicle comprising a liquid highly volatile at room temperature, which method comprises incorporating in said luminescent material during its production from about 25% to about 75% excess activator over that required to provide maximum brilliancy in an identical matrix material if unground when exposed to a mercury discharge radiation, whereby to prevent the usual loss of brilliancy during grinding, and grinding together the said luminescent material and at least a portion of said liquid vehicle, the proportion of liquid vehicle in the completed suspension being controlled to produce a freely flowing suspension of liquid-like character.

11. The method of producing a suspension of luminescent material adapted for coating a mercury discharge tube by a method involving flowing the said suspension into and out of a tube while said tube is held in a vertical position, said suspension comprising a very finely divided luminescent material consisting of a matrix material and an activator and a liquid vehicle comprising a liquid highly volatile at room temperature, which method comprises incorporating in said luminescent material during its production from about 25% to about 75% excess activator over that required to provide maximum brilliancy in an identical matrix material if unground when exposed to a mercury discharge radiation, whereby to prevent the usual loss of brilliancy during grinding, and grinding together the said luminescent material and at least a proportion of said liquid vehicle, the grinding being continued until a test shows that the suspension, if flowed into and out of a tube, will not leave horizontal streaks on the inside surface of the tube, the grinding being discontinued, however, before a similar test will show the presence of vertical streaks, the proportion of liquid vehicle in the completed suspension being controlled to produce a freely flowing suspension of liquid-like character.

12. The method of producing a suspension of luminescent material adapted for coating a mercury discharge tube by a method involving flowing the said suspension into and out of a tube while said tube is held in a vertical position, said suspension comprising a very finely divided luminescent material consisting of a matrix material and an activator and a liquid vehicle comprising a liquid highly volatile at room temperature, which method comprises incorporating in said luminescent material during its production from about 25% to about 75% excess activator over that required to provide maximum brilliancy in an identical matrix material if unground when exposed to a mercury discharge radiation, whereby to prevent the usual loss of brilliancy during grinding, and grinding together the said luminescent material and at least a proportion of said liquid vehicle until the particle size of the luminescent material is finer than 400 mesh, the proportion of liquid vehicle in the final suspension being controlled so that the final suspension has proportions of the order of one pound of luminescent material to 1000 cc. of the liquid vehicle.

SAMPSON ISENBERG.
RUDOLPH C. HULTGREN.